United States Patent Office 3,296,179
Patented Jan. 3, 1967

3,296,179
EPOXIDIZED POLYMER OF BUTADIENE CURED WITH OXALIC OR MALONIC ACID AT ROOM TEMPERATURE
Fred Lister, Belle Mead, N.J., Charles G. Cullen, Yardley, Pa., and Theodore R. Hopper, Cranford, N.J., assignors to FMC Corporation, New York, N.Y., a corporation of Delaware
No Drawing. Filed Mar. 25, 1963, Ser. No. 267,782
4 Claims. (Cl. 260—31.2)

This invention relates to novel room temperature curable coating compositions derived from epoxidized polymers of butadiene, and to a method of preparing room temperature cured coatings from epoxidized polymers of butadiene. More particularly, this invention relates to coating compositions containing epoxidized polymers of butadiene and oxalic or malonic acid.

It is well known that various polymeric structures containing oxirane oxygen groups can be cured to thermoset products by crosslinking with polyfunctional curing agents such as polyamines, polyamides, and polycarboxylic acids and anhydrides. In U.S. Patent Nos. 2,829,130 and 2,829,135, Greenspan and Light teach that epoxidized homopolymers and copolymers of butadiene may be cured by heating the resin at elevated temperatures in the presence of a polycarboxylic acid or anhydride as the curing agent. In recent years, there has been much investigation of room temperature curable systems for epoxidized polymers of butadiene. However, heretofore, no curing system has been developed for satisfactorily curing these resins at room temperature.

It is an object of this invention to provide a room temperature curable coating composition derived from epoxidized polymers of butadiene. It is a further object to provide a method of preparing a room temperature cured coating from epoxidized polymers of butadiene. These and other objects will become apparent from the following description of this invention.

We have now discovered that coating compositions containing (a) an epoxidized polymer of butadiene having an oxirane oxygen content of about 6–12% by weight in which 60–100% of the polymer forming units are derived from butadiene and the balance from an ethylenically unsaturated comonomer, and (b) a volatile organic solvent solution of a dicarboxylic acid selected from the group consisting of oxalic acid and malonic acid containing 0.05–0.4 mole of dicarboxylic acid per oxirane equivalent of epoxidized polymer of butadiene are readily cured at room temperature. The resulting coatings are hard, tough and adherent and have excellent solvent and chemical resistance.

As pointed out above, dicarboxylic acids are well known curing agents for epoxidized polymers of butadiene; however, they have heretofore always required elevated temperatures of the order of 100° C. or strong catalysts to effect full cure. Moreover, even in prior catalyzed curing systems, the room temperature cured coatings soften, blister and lift in less than one hour when immersed in solvents such as methyl isobutyl ketone and toluene. It is qutie surprising therefore that the two lowest members of the series of dicarboxylic acids, when dissolved in a volatile organic solvent, rapidly and completely cure epoxidized polymers of butadiene at room temperature to coatings which are resistant to immersion in organic solvents for extended periods of time. This result cannot be achieved with any other dicarboxylic acid, including the next higher homologue, succinic acid.

The epoxidized polymers of butadiene used as the base resin for the coating compositions taught herein are prepared by epoxidizing a liquid polymer of butadiene. Suitable polymers of butadiene include polybutadienes and copolymers of butadiene containing at least 60% butadiene and, as the balance, an ethylenically unsaturated comonomer. Any of the conventional comonomers may be used including vinylbenzenes such as styrene, vinyltoluene, α-methylstyrene, dimethylstyrene and diethylstyrene; acrylates such as acrylonitrile, methacrylonitrile, methyl acrylate, methyl methacrylate and ethyl acrylate; vinyl esters such as vinyl acetate and vinyl propionate; vinyl halides such as vinyl chloride and vinyl bromide; vinyl ethers such as vinyl ethyl ether and vinyl isobutyl ether; vinyl ketones such as methyl vinyl ketone and methyl isopropenyl ketone; and vinyl alcohol, as well as many other well known ethylenically unsaturated co-monomers. In other words, it makes no difference what the comonomer is, so long as at least 60% of the polymer is derived from butadiene. These polymers may be prepared by any conventional polymerization technique, including free-radical, alkali metal, Friedel-Crafts, and organo-metallic catalysts. Useful techniques for the polymerization of butadiene and mixtures of butadiene and styrene are described in Patent Nos. 2,631,175 and 2,791,618.

For the epoxidation of the polymer of butadiene, standard epoxidation techniques may be used. Aliphatic, aromatic and inorganic peracids, salts of peracids, peroxides, and hydroperoxides are the most common of the effective epoxidizing agents. For convenience, the lower aliphatic peracids such as performic, peracetic, perpropionic, and perbutyric are preferred reagents. With these reagents, the epoxidation reaction may be carried out using a preformed peracid mixture, or the peracid may be formed in the reaction medium, generally by adding hydrogen peroxide to an aliphatic acid or anhydride medium. Peracids may be prepared in any known way, such as is described in Organic Synthesis, Reinhold Publishing Corp. (1957), page 302. A number of epoxidation techniques for polymers of butadiene are illustrated in U.S. Patent Nos. 2,829,130 and 2,829,135 to Greenspan and Light.

Preferably, the epoxidation is carried out by the in situ formation of peracetic acid, whereby the polymer of butadiene is reacted with acetic acid and hydrogen peroxide in the presence of an ion exchange resin and a solvent. The solvent may be any low-boiling solvent for the product, such as benzene or toluene. When the reaction is complete, the epoxidation product is allowed to separate into an aqueous phase and a solvent phase. The solvent is then removed from the resin product by vacuum stripping. This method of epoxidation is described by Greenspan and Gall, in U.S. Patent No. 2,919,283.

The epoxidation may be conducted using stoichiometric amounts of the peracid; that is, one mole of peracid per double bond in the polymer; or an amount below that theoretically required may be used. There is no significant advantage in using excess oxidant. In general, the epoxidized polymer should contain at least about 6% by weight of oxirane oxygen, and it is preferred for most applications to employ epoxidized polymers containing about 7–9% oxirane oxygen. Resins containing less than 6% oxirane oxygen may be used, but reactivity is reduced and the resulting films tend to be less solvent resistant. Epoxidized polymers containing more than about 12% oxirane oxygen tend to be extremely viscous, and are difficult to prepare.

The coating compositions of this invention are prepared by blending the epoxidized polymer of butadiene with a volatile organic solvent solution of oxalic or malonic acid. The dicarboxylic acid should be present in an amount of about 0.05–0.4 mole per oxirane equivalent of epoxidized polymer. When less than about 0.05 mole of dicarboxylic acid is used, there is insufficient curing agent for complete cure and the resulting films tend to be soft. When more than about 0.4 mole of dicarboxylic acid is used, the coating will cure rapidly at room temperature, but it will contain excess free acid and thus have inferior caustic and water resistance. For best results, about 0.08–0.2 mole of dicarboxylic acid per oxirane equivalent of epoxidized polymer should be employed.

In order to achieve a room temperature cure between the epoxidized polymer and the dicarboxylic acid, it is necessary that the dicarboxylic acid be completely dissolved in a volatile organic solvent. In order to completely dissolve the dicarboxylic acid, at least about 4 parts by weight of solvent should be present for each part of dicarboxylic acid. In other words, concentrated solutions generally do not contain more than about 20% dicarboxylic acid. On the other hand, large excesses, such as more than about 12 parts of solvent per part of dicarboxylic acid, give no particular advantage, while increasing the cost of the coating composition and the amount of solvent which must evaporate during curing. Preferably, 5–10 parts of solvent should be employed for each part of dicarboxylic acid, which represents solutions of about 9–17%.

Any volatile organic solvent for oxalic or malonic acid may be used to promote the room temperature cure of this invention. In general, hydrocarbons are not solvents for these acids, while most oxygen containing organic compounds will dissolve them. When the coating composition of this invention is used immediately after formulation, it is not necessary that the organic solvent be nonreactive with the dicarboxylic acid. For example, reactive solvents such as primary alcohols do not materially interfere with the results of the invention, since the solvent will begin to evaporate immediately upon application as a coating and the dicarboxylic acid is more reactive with the oxirane oxygen groups than with the alcohol. The volatility of the solvent need only be sufficient that it will evaporate in a reasonable time when applied as a film.

Preferably, the solvent solution of dicarboxylic acid should be relatively stable for extended periods of time so that the solution can be stored without appreciable loss of dicarboxylic acid. Accordingly, solvents such as tertiary alcohols are preferred to primary and secondary alcohols. The preferred solvents include tertiary alkyl alcohols of 4–9 carbon atoms, such as tert-butyl alcohol, tert-amyl alcohol, dimethylbutylcarbinol, diethylpropylcarbinol, ethylmethylpropylcarbinol and diethylisobutylcarbinol; alkylene glycol alkyl ether acetates of 5–9 carbon atoms such as ethylene glycol methyl ether acetate, ethylene glycol ethyl ether acetate, ethylene glycol propyl ether acetate, ethylene glycol butyl ether aceate, propylene glycol ethyl ether acetate and propylene glycol butyl ether acetate; alkyl esters of 2–9 carbon atoms such as methyl, ethyl, propyl, butyl, amyl, heptyl and octyl formates, methyl, ethyl, propyl, isopropyl, butyl, sec-butyl, isobutyl, tert-butyl, amyl, and methylamyl acetates, dimethyl and diethyl oxalates, methyl, ethyl, propyl, butyl, amyl, and methylamyl propionates, methyl, ethyl, propyl, butyl, and amyl butyrates, methyl, ethyl, propyl, and butyl pentoates, methyl, ethyl, and propyl hexoates, methyl and ethyl heptoates, methyl-2-ethylhexoate, and methyl octoate; and alkyl ketones of 2–9 carbon atoms such as dimethyl, methyl, ethyl, diethyl, methyl propyl, ethyl propyl, dipropyl, ethyl butyl, methyl propyl, ethyl butyl, methyl isobutyl, diisobutyl, methyl amyl, methyl isoamyl, and ethyl amyl ketones. The preferred solvent is a mixture of tert-butyl alcohol and ethylene glycol ethyl ether acetate in a ratio of 2:3 to 3:2.

The coating compositions of this invention cannot be completely formulated until they are ready for use, since the dicarboxylic acid will begin to react with the epoxidized polymer as soon as they are blended. The pot life of these coating compositions is generally about 4–72 hours at room temperature. For this reason, these compositions are prepared as a two-package system; one containing the epoxidized polymer, and the other containing the dicarboxylic acid dissolved in a volatile organic solvent. The two components of the coating composition are then blended together at the time and place of application.

In addition to the essential ingredients specified above, the coating compositions of this invention may also contain other additives, if desired, to impart particular properties to the final coating composition. For example, it is generally desirable to add a solvent for the epoxidized polymer to reduce the viscosity of the coating composition so that it can be handled more easily. The use of a solvent for the epoxidized polymer also has the effect of increasing the pot life of the coating composition. Any of the well known volatile organic solvents for these resins may be used. Suitable solvents include aromatic hydrocarbons such as toluene, styrene, xylene, trimethylbenzene and tetramethylbenzene; halogenated hydrocarbons such as chloroform, dichloroethylene and trichloroethylene; aliphatic ketones such as dimethyl, methyl ethyl, diethyl, methyl propyl, ethyl propyl, dipropyl, ethyl butyl, methyl isobutyl, diisobutyl, methyl amyl, ethyl amyl, and methyl isoamyl ketones; aliphatic glycol ether acetates such as ethylene glycol butyl ether acetate; aliphatic esters such as butyl acetate, amyl acetate and butyl propionate; and many others.

In addition to one or more of these solvents, any of the well known auxiliary diluents for these resins may also be used, if desired. Suitable diluents include aliphatic hydrocarbons such as mineral spirits; substituted hydrocarbons such as 2-nitropropane; aliphatic alcohols such as ethanol, sec-butanol, and isopropanol; aliphatic glycol ether acetates such as ethylene glycol ethyl ether acetate; and many others. Alcohols are particularly preferred since they increase the solubility of the dicarboxylic acid in the system.

The final coating composition may also contain suitable inorganic mineral fillers including silicates such as clays and talcs, carbonates, silicas, mica, barium sulfate, carbon black and the like, if desired. These fillers serve to lower the cost of the coating composition, and to modify rheological properties, thus permitting application of thick films to vertical surfaces. The coating compositions may also contain pigments such as titanium dioxide, chromium oxide, iron oxide, phthalocyanine green and blue, toluidine red, nickel titanium yellow and others, if desired.

As stated before, the pot life of these compositions will vary from about 4 hours to about 3 days. In general, malonic acid gives a longer pot life than does oxalic acid. Increasing the amount of solvent present also has the effect of lengthening the pot life. When a solvent solution of oxalic acid is used with sufficient solvent to reduce the viscosity of the coating composition to the range generally desired for application as a coating, the pot life will be about 12–15 hours. The pot life is also affected to some extent by the size of the batch, larger batches giving a slightly shorter pot life.

The coating compositions of this invention may be applied to any desired surface by spraying, brushing, knife coating, roller coating, and dipping. These coatings are used primarily for coating metals such as iron, steel, aluminum, copper, zinc, brass, bronze, etc., but may also be used for coating non-metallic materials such as plastic, wood and masonry products, as well as many other structural materials.

The coatings of this invention are readily cured at room temperature, that is, at the temperature prevailing at the time of application of the coating. In other words, it is not necessary to apply heat to induce curing of these coatings. Temperatures as low as about 0° C. have been sucessfully used to cure these coatings.

The coatings of this invention generally dry to a tack-free state in about 2-6 hours after they have been applied and in most cases in about 3 hours; they reach ultimate cure after about 2-5 days at room temperature. These coatings are hard, tough and adherent, and have outstanding resistance to mineral and organic acids, alkalies, water, aqueous salt solutions, and organic solvents including alcohols such as ethyl alcohol, ketones such as methyl isobutyl ketone, aromatic solvents such as benzene and toluene and chlorinated solvents such as percholoroethylene and carbon tetrachloride.

The following examples, illustrating the novel coating compositions of this invention, are presented without any intention that the invention be limited thereto. All parts and percentages are by weight.

*Example 1*

Butadiene was polymerized as follows: About 4.3 parts of sodium as a 45% dispersion in kerosene and 162 parts of benzene were charged to an agitated reactor, the temperature was raised to 90° C., and 3.0 parts of technical grade butadiene was added. The temperature was maintained at 85° C., while 97 parts of butadiene and 20 parts of dioxane were added over a period of 3.5 hrs. The reaction ingredients were then cooled to 50° C. and the catalyst was destroyed by the addition of 19 parts of glacial acetic acid. The mixture was filtered through 21 parts of soda ash, and the filtrate was stripped of volatiles over a temperature range of 19-55° C. at 23-57 mm. Hg. The residue was a liquid polybutadiene having an iodine number of 383, a viscosity of 16.4 poises at 25° C., extrapolated to zero shear, and a number of average molecular weight of 980.

The polybutadiene was epoxidized as follows: One hundred parts of the polybutadiene, 100 parts of benzene, 32 parts of Dowex resin 50 X-12 (a sulfonated styrene-divinylbenzene polymer crosslinked with 12% divinylbenzene), and 16 parts of glacial acetic acid were heated with agitation to 60° C. Seventy parts of 50% hydrogen peroxide was then added over a period of 3 hrs. The temperature was maintained at 60° C. for an additional 2 hours., after which the mixture was cooled to 30° C., mixed with 123 parts of benzene and 26 parts of soda ash, and allowed to settle. The oily layer was separated and filtered. The filtrate was heated to 80° C. to remove water azeotropically, and then stripped of benzene at 80° C. and 60 mm. Hg. The epoxidized polybutadiene obtained as a residue had an oxirane oxygen content of 8.98% and a viscosity of 1685 poises at 25° C., extrapolated to zero shear.

A two-package coating composition was prepared from this epoxidized polybutadiene using the following formulation:

COMPONENT A

| Ingredient: | Parts |
| --- | --- |
| Epoxidized polybutadiene | 100 |

COMPONENT B

| | |
| --- | --- |
| Oxalic acid | 19.5 |
| Tert-butyl alcohol | 47.2 |
| Ethylene glycol ethyl ether acetate | 47.2 |

Components A and B were intimately mixed together by stirring and applied to a solvent cleaned cold rolled steel plate with a doctor blade. The resulting coating dried in 6 hrs. to a tack-free state, and in about 5 days to a hard, solvent and chemical resistant film. The above mixture had a useful pot lift of 6 hrs. at 25° C.

*Example 2*

A commercially available polybutadiene, prepared by sodium-catalyzed polymerization in the presence of dioxane as illustrated in Example 1 and having a molecular weight of 3,500, an iodine number of 430 and a viscosity of 200 poises, was epoxidized as follows: One hundred parts of the polybutadiene, 200 parts of benzene, 32 parts of Dowex resin 50 X-12 (a sulfonated styrene-divinylbenzene polymer crosslinked with 12% divinylbenzene), and 16 parts of glacial acetic acid were heated with agitation to 60° C. Seventy parts of 50% hydrogen peroxide was added over a period of 3 hrs. The temperature was maintained at 60° C. for an additional 2 hrs., after which the mixture was cooled to 30° C., and the product was recovered in the manner set forth in Example 1. The resulting epoxidized polybutadiene had an oxirane oxygen content of 9% and a viscosity greater than 80,000 poises at 100% nonvolatiles and 160 poises as a 75% solution in xylene at 25° C.

A two-package coating composition was prepared from this epoxidized polybutadiene using the following formulation:

COMPONENT A

| Ingredient: | Parts |
| --- | --- |
| Epoxidized polybutadiene | 100 |
| Xylene | 90 |
| Sec-butyl alcohol | 60 |

COMPONENT B

| | |
| --- | --- |
| Oxalic acid | 6.5 |
| Tert-butyl alcohol | 18.4 |
| Ethylene glycol ethyl ether acetate | 18.4 |

Components A and B were intimately mixed together by stirring and applied to a solvent cleaned cold rolled steel plate by spraying. The resulting coating dried in 3 hrs. to a tack-free state, and in 3 days to a hard, solvent and chemical resistant film. The above mixture had a useful pot life of 13 hrs. at 25° C.

*Example 3*

A commercially available copolymer containing 70% butadiene and 30% styrene, prepared by sodium-catalyzed polymerization in the presence of dioxane as illustrated in Example 1 and having a molecular weight of 9,000 and an iodine number of 300, was epoxidized as follows: One hundred parts of the copolymer and 200 parts of toluene were heated to 70° C., and 270 parts of 40% peracetic acid was added over a period of 1 hr. The temperature was maintained at 70° C. for an addtiional 2.5 hrs., after which the mixture was cooled to 30° C., and the product was recovered in a manner similar to Example 1. The resulting epoxidized copolymer was a soluble semi-solid having a viscosity of about 600 poises, measured as a 75% solution in xylene at 25° C., and an oxirane oxygen content of 8.9% by weight.

A two-package coating composition was prepared from this epoxidized copolymer using the following formulation:

COMPONENT A

| Ingredient: | Parts |
| --- | --- |
| Epoxidized butadiene copolymer | 100 |
| Xylene | 150 |
| Sec-butyl alcohol | 50 |

COMPONENT B

| | |
| --- | --- |
| Oxalic acid | 6.5 |
| Tert-butyl alcohol | 18.4 |
| Ethylene glycol ethyl ether acetate | 18.4 |

Components A and B were intimately mixed together by stirring and applied to a solvent cleaned cold rolled steel plate by brushing. The resulting coating dried in 3 hrs. to a tack-free state, and in about 3 days to a hard film having excellent solvent and chemical resistance.

Example 4

A commercially available copolymer containing 75% butadiene and 25% vinyl acetate and having a molecular weight of 3,000, an iodine number of 320 and a viscosity of 180 poises was epoxidized as follows: One hundred parts of the copolymer and 235 parts of toluene were heated to 60° C., and 666 parts of a mixture containing 40% peracetic acid and distilled water in a 1:3 ratio was added over a period of 1 hr. The temperature was maintained at 65° C. for an additional 2.5 hrs., after which the mixture was cooled to 30° C. and the product was recovered in the manner set forth in Example 1. The resulting epoxidized copolymer was a semi-solid and had an oxirane oxygen content of 7.2%.

A two-package coating composition was prepared from this epoxidized copolymer using the following formulation:

COMPONENT A

| Ingredient: | Parts |
| --- | --- |
| Epoxidized copolymer | 100 |
| Xylene | 90 |
| Sec-butyl alcohol | 60 |

COMPONENT B

| Oxalic acid | 5.1 |
| --- | --- |
| Tert-butyl alcohol | 14.4 |
| Ethylene glycol ethyl ether acetate | 14.5 |

Components A and B were intimately mixed together by stirring and applied to a solvent cleaned cold rolled steel plate by spraying. The resulting coating dried in 3 hrs. to a tack-free state, and in 5 days to a hard, solvent and chemical resistant film. The above mixture had a useful pot life of 15 hrs. at 25° C.

Example 5

The commercially available polybutadiene described in Example 2 was epoxidized as follows: One hundred parts of polybutadiene was dissolved in 200 parts of xylene, and 10 parts of 90% formic acid was added. The mixture was maintained at 75° C., while 65 parts of 50% hydrogen peroxide was added over a period of 1 hr. The reaction continued at a reflux temperature of about 75° C. for an additional 4 hrs., after which the reaction mixture was cooled to 30° C., and the product was recovered in a manner similar to Example 1. The resulting epoxidized polybutadiene had an oxirane oxygen content of 6.9% and a viscosity of 18 poises, measured as a 75% solution in xylene at 25° C.

A two-package coating composition was prepared from this epoxidized polybutadiene using the following formulation:

COMPONENT A

| Ingredient: | Parts |
| --- | --- |
| Epoxidized polybutadiene | 100 |
| Toluene | 85 |
| Sec-butyl alcohol | 55 |
| Rutile titanium dioxide | 70 |
| Talc | 29 |

COMPONENT B

| Oxalic acid | 10.2 |
| --- | --- |
| Tert-butyl alcohol | 28.9 |
| Ethylene glycol ethyl ether acetate | 28.9 |

Components A and B were intimately mixed together by stirring and applied to a solvent cleaned aluminum plate by spraying. The resulting coating dried in 3 hrs. to a tack-free state, and in 5 days to a hard, solvent and chemical resistant film. The coating composition had a pot life of 18 hrs. at 25° C.

Example 6

The commercially available polybutadiene described in Example 2 was epoxidized as follows: One hundred parts of polybutadiene was dissolved in 200 parts of toluene, and 10 parts of 90% formic acid was added. The mixture was maintained at 70° C., while 85 parts of 50% hydrogen peroxide was added over a period of 1 hr. The reaction continued at a reflux temperature of 75° C. for an additional 4 hrs., after which the mixture was cooled to 30° C., and the product was recovered in a manner similar to Example 1. The resulting epoxidized polybutadiene had an oxirane oxygen content of 8% and a viscosity of 30 poises, measured as a 75% solution in xylene at 25° C., as a 75% solution in xylene at 25° C.

A two-package coating composition was prepared from this epoxidized polybutadiene using the following formulation:

COMPONENT A

| Ingredient: | Parts |
| --- | --- |
| Epoxidized polybutadiene | 100 |
| Xylene | 20 |
| n-Butanol | 10 |

COMPONENT B

| Oxalic acid | 22.8 |
| --- | --- |
| Tert-butyl alcohol | 64.8 |
| Ethylene glycol ethyl ether acetate | 64.8 |

Components A and B were intimately mixed together by stirring and applied to a piece of pine core board by spraying. The resulting coating dried in 2 hrs. to a tack-free state, and in 5 days to a hard, solvent and chemical resistant film. The coating composition had a pot life of 10 hrs. at 25° C.

Example 7

The commercially available polybutadiene described in Example 2 was epoxidized as follows: One hundred parts of the polybutadiene and 200 parts of xylene were heated to 60° C., and 375 parts of 30% peracetic acid was added over a period of 1 hr. The temperature was maintained at 60° C. for an additional 3 hrs., after which the mixture was cooled to 30° C., and the product was recovered in a manner similar to Example 1. The resulting epoxidized polybutadiene had an oxirane oxygen content of 10.1% and a viscosity of 100 poises, measured as a 75% solution in xylene at 25° C.

A two-package coating composition was prepared from this epoxidized polybutadiene using the following formulation:

COMPONENT A

| Ingredient: | Parts |
| --- | --- |
| Epoxidized polybutadiene | 100 |
| Xylene | 100 |
| Sec-butyl alcohol | 100 |

COMPONENT B

| Oxalic acid | 4.8 |
| --- | --- |
| Tert-butyl alcohol | 13.6 |
| Ethylene glycol ethyl ether acetate | 13.6 |

Components A and B were intimately mixed together by stirring and applied to a solvent cleaned cold rolled steel plate by spraying. The resulting coating dried in 6 hrs. to a tack-free state, and in 5 days to a hard, solvent and chemical resistant film. The coating composition had a pot life of 12 hrs. at 25° C.

Example 8

A two-package coating composition was prepared from the epoxidized polybutadiene described in Example 2 using the following formulation:

COMPONENT A

| Ingredient: | Parts |
| --- | --- |
| Epoxidized polybutadinene | 100 |
| Xylene | 90 |
| Sec-butyl alcohol | 60 |

COMPONENT B

| Malonic acid | 5.2 |
| --- | --- |
| Tert-butyl alcohol | 10.4 |
| Ethylene glycol ethyl ether acetate | 10.4 |

Components A and B were intimately mixed together by stirring and applied to a solvent cleaned cold rolled steel plate by brushing. The resulting coating dried in 3 hrs. to a tack-free state, and in 5 days to a hard, solvent and chemical resistant film. The above mixture had a useful pot life of 60 hrs. at 25° C.

*Example 9*

A two-package coating composition was prepared from the epoxidized polybutadiene described in Example 2 using the following formulation:

COMPONENT A

| Ingredient: | Parts |
|---|---|
| Epoxidized polybutadiene | 100 |
| Xylene | 200 |

COMPONENT B

| Oxalic acid | 6.5 |
|---|---|
| Tert-amyl alcohol | 36.8 |

Components A and B were intimately mixed together by stirring and applied to a solvent cleaned cold rolled steel plate by spraying. The resulting coating dried in 3 hrs. to a tack-free state, and in 5 days to a hard, solvent and chemical resistant film.

*Example 10*

A two-package coating composition was prepared from the epoxidized polybutadiene described in Example 2 using the following formulation:

COMPONENT A

| Ingredient: | Parts |
|---|---|
| Epoxidized polybutadiene | 100 |
| Xylene | 90 |
| Sec-butyl alcohol | 60 |

COMPONENT B

| Oxalic acid | 6.5 |
|---|---|
| Tert-butyl alcohol | 18.4 |
| Hexyl acetate | 18.4 |

Components A and B were intimately mixed together by stirring and applied to a solvent cleaned cold rolled steel plate by brushing. The resulting coating dried in 3 hrs. to a tack-free state, and in 5 days to a hard, solvent and chemical resistant film.

*Example 11*

A two-package coating composition was prepared from the epoxidized polybutadiene described in Example 2 using the following formulation:

COMPONENT A

| Ingredient: | Parts |
|---|---|
| Epoxidized polybutadiene | 100 |
| Xylene | 90 |
| Sec-butyl alcohol | 60 |

COMPONENT B

| Oxalic acid | 6.5 |
|---|---|
| Tert-butyl alcohol | 18.4 |
| Diisobutyl ketone | 18.4 |

Components A and B were intimately mixed together and applied to a solvent cleaned cold rolled steel plate by brushing. The resulting coating dried in 3 hrs. to a tack-free state, and in about 5 days to a hard, solvent and chemical resistant film.

As will be apparent to those skilled in the art, numerous modifications and variations of the formulation of the coating compositions of this invention may be made without departing from the spirit of the invention or the scope of the following claims.

We claim:

1. A method of curing an epoxidized polymer of butadiene at room temperature to a hard, tough, adherent and solvent and chemical resistant film which comprises: mixing
   (a) an epoxidized polymer of butadiene having an oxirane oxygen content of 6–12% by weight in which 60–100% of the polymer forming units are derived from butadiene and the balance from an ethylenically unsaturated comonomer and
   (b) a volatile organic solvent solution of a dicarboxylic acid selected from the group consisting of oxalic acid and malonic acid containing 0.05–0.4 mole of dicarboxylic acid per oxirane equivalent of epoxidized polymer of butadiene,
applying the mixture as a coating, and allowing the coating to cure at room temperature.

2. A method of curing an epoxidized polymer of butadiene at room temperature to a hard, tough, adherent and solvent and chemical resistant film which comprises: mixing
   (a) an epoxidized polymer of butadiene having an oxirane oxygen content of 6–12% by weight in which 60–100% of the polymer forming units are derived from butadiene and the balance from styrene,
   (b) a volatile organic solvent for the epoxidized polymer,
   (c) 0.05–0.4 mole, per oxirane equivalent of epoxidized polymer of butadiene, of a dicarboxylic acid selected from the group consisting of oxalic acid and malonic acid, and
   (d) 4–12 parts by weight, per part of dicarboxylic acid, of a solvent for the dicarboxylic acid selected from the group consisting of tertiary alkyl alcohols of 4–9 carbon atoms, alkylene glycol alkyl ether acetates of 5–9 carbon atoms, alkyl esters of 2–9 carbon atoms, alkyl ketones of 2–9 carbon atoms, and mixtures thereof,
applying the mixture as a coating, and allowing the coating to cure at room temperature.

3. A method of curing an epoxidized polymer of butadiene at room temperature to a hard, tough, adherent and solvent and chemical resistant film which comprises: mixing
   (a) an epoxidized polybutadiene having an oxirane oxygen content of 7–9% by weight,
   (b) a volatile organic solvent for the epoxidized polybutadiene,
   (c) 0.08–0.2 mole, per oxirane equivalent of epoxidized polybutadiene, of oxalic acid, and
   (d) 5–10 parts by weight, per part of oxalic acid, of a solvent for the oxalic acid selected from the group consisting of tertiary alkyl alcohols of 4–9 carbon atoms, alkylene glycol alkyl ether acetates of 5–9 carbon atoms, alkyl esters of 2–9 carbon atoms, alkyl ketones of 2–9 carbon atoms, and mixtures thereof,
applying the mixture as a coating, and allowing the coating to cure at room temperature.

4. The method of curing an epoxidized polymer of butadiene at room temperature of claim 3 wherein the solvent for the oxalic acid is a mixture of tert-butyl alcohol and ethylene glycol ethyl ether acetate in a ratio of 2:3 to 3:2.

References Cited by the Examiner

UNITED STATES PATENTS

| 2,500,449 | 3/1950 | Bradley | 260—31.4 |
| 2,829,135 | 4/1958 | Greenspan et al. | 260—94.7 |
| 2,949,441 | 8/1960 | Newey | 260—94.7 |

MORRIS LIEBMAN, *Primary Examiner.*

ALEXANDER H. BRODMERKEL, *Examiner.*

L. T. JACOBS, *Assistant Examiner.*